(12) United States Patent
Mondello et al.

(10) Patent No.: US 12,045,339 B2
(45) Date of Patent: Jul. 23, 2024

(54) SYSTEM ON CHIP FOR CRYPTOGRAPHY APPLICATIONS INCLUDING A MONOTONIC COUNTER AND METHOD OF OPERATION

(71) Applicant: STMicroelectronics S.r.l., Agrate Brianza (IT)

(72) Inventors: Antonino Mondello, Messina (IT); Alessandro Inglese, San Pietro Clarenza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 408 days.

(21) Appl. No.: 17/469,234

(22) Filed: Sep. 8, 2021

(65) Prior Publication Data
US 2022/0100848 A1 Mar. 31, 2022

(30) Foreign Application Priority Data
Sep. 30, 2020 (FR) ........................................ 2009973

(51) Int. Cl.
*G06F 21/55* (2013.01)
*G06F 1/26* (2006.01)

(52) U.S. Cl.
CPC ................ *G06F 21/55* (2013.01); *G06F 1/26* (2013.01); *G06F 2221/034* (2013.01)

(58) Field of Classification Search
CPC .................................. G06F 21/55; G06F 1/26
See application file for complete search history.

(56) References Cited

U.S. PATENT DOCUMENTS

| | | | | |
|---|---|---|---|---|
| 6,249,562 B1* | 6/2001 | Wells | ................... | H03K 21/403 377/34 |
| 2004/0177213 A1 | 9/2004 | Engel et al. | | |
| 2006/0059385 A1 | 3/2006 | Atri et al. | | |
| 2009/0268541 A1* | 10/2009 | Goodnow | .............. | G11C 5/143 365/226 |
| 2010/0313056 A1* | 12/2010 | Margolis | ................. | G06F 21/57 713/400 |
| 2010/0332859 A1* | 12/2010 | Trantham | .................. | G06F 1/26 713/300 |
| 2020/0202944 A1* | 6/2020 | Mondello | ............ | G11C 16/105 |

* cited by examiner

*Primary Examiner* — Vance M Little
(74) *Attorney, Agent, or Firm* — Slater Matsil, LLP

(57) ABSTRACT

In an embodiment a system on chip includes a persistent power supply and anti-replay mechanism comprising a monotonic counter including a volatile counter register powered by the persistent power supply.

19 Claims, 2 Drawing Sheets

[Fig 1]
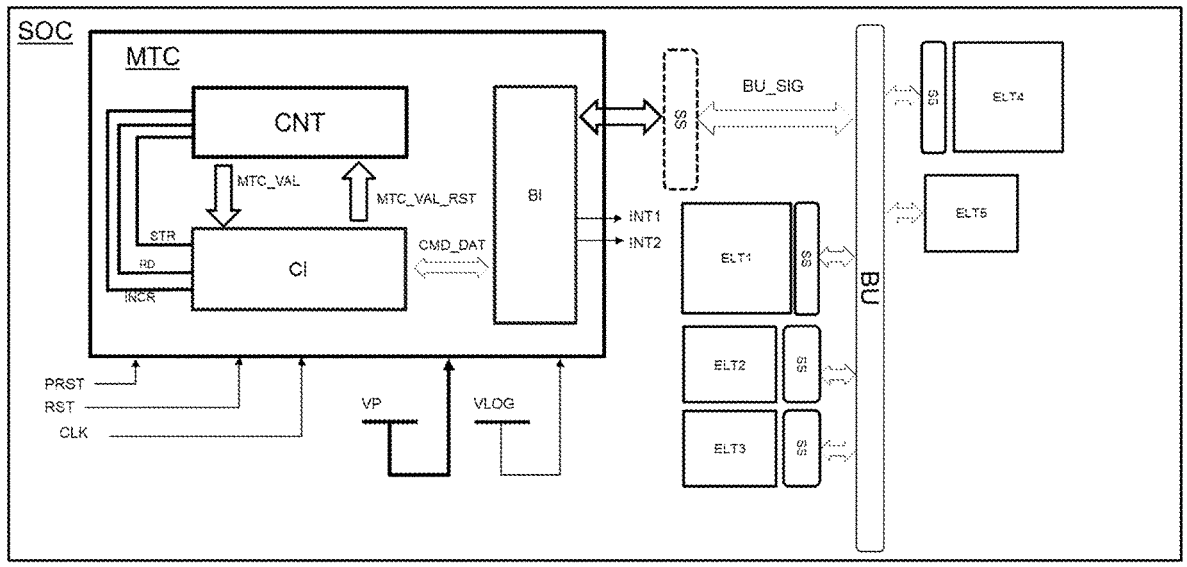
[Fig 2]
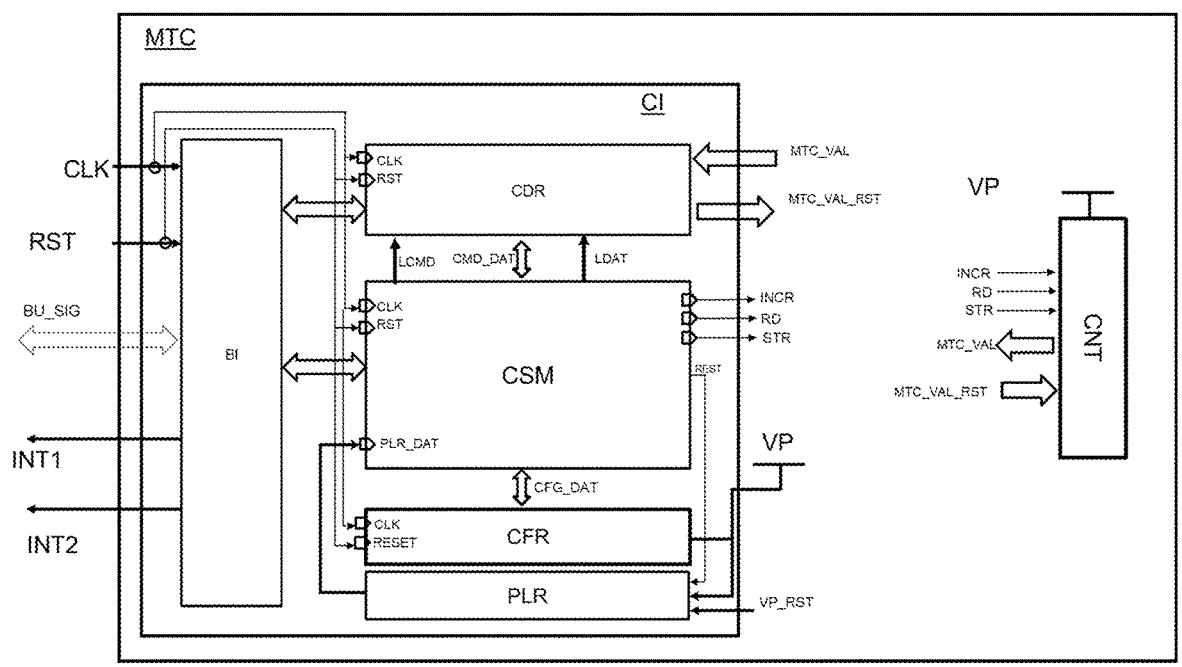

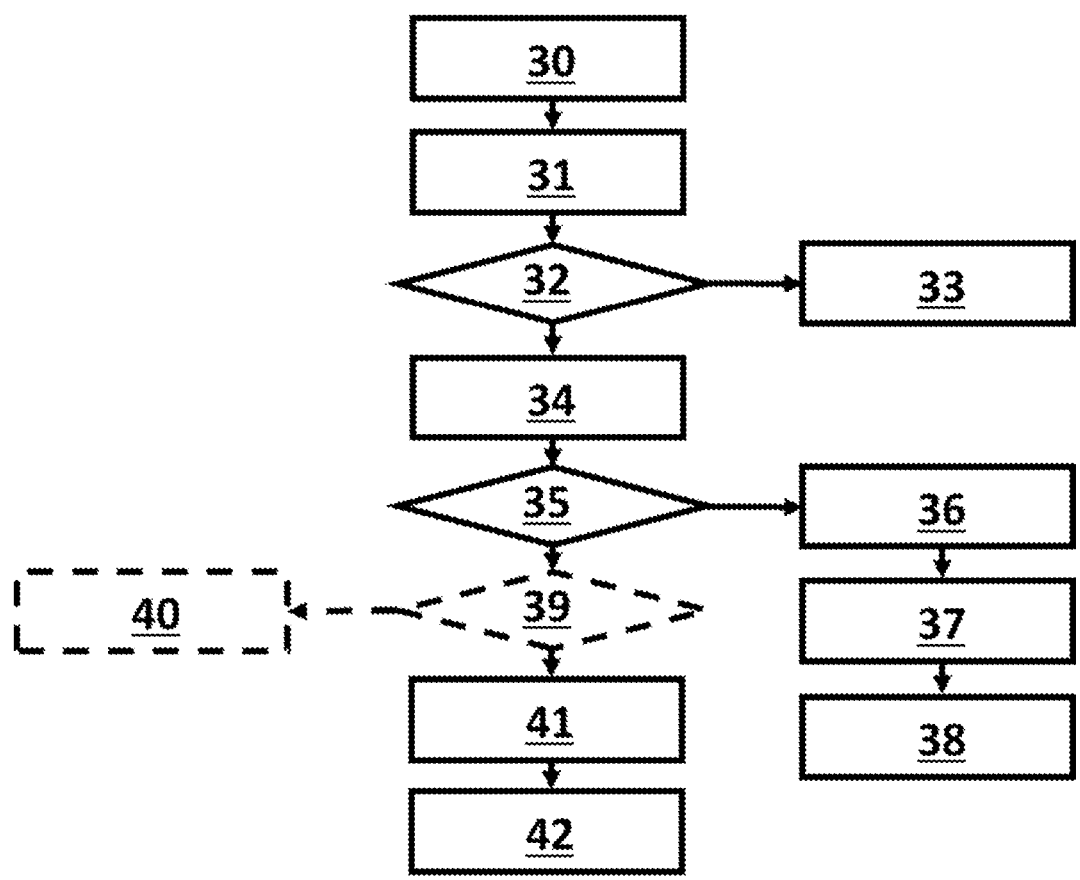
[Fig 3]

SYSTEM ON CHIP FOR CRYPTOGRAPHY APPLICATIONS INCLUDING A MONOTONIC COUNTER AND METHOD OF OPERATION

CROSS-REFERENCE TO RELATED APPLICATIONS

This application claims the benefit of French Patent Application No. 2009973, filed on Sep. 30, 2020, which application is hereby incorporated herein by reference.

TECHNICAL FIELD

Embodiments of the present invention relate to a system on chip, in particular a system on chip comprising a monotonic counter for cryptography applications and a method for operating such monotonic counter.

BACKGROUND

As is known, electronic devices are widespread, especially in the field of wireless communication, such as electronic devices for the IoT ("Internet of Things"), where it is required to encrypt the messages exchanged between two devices, in order to obtain a secure transfer of data.

Typically, the sending and receiving operations of signed and/or encrypted messages are executed by systems built on a single system on chip ("system on a chip"), embedded in the electronic devices themselves.

More particularly, the message is encrypted when the secrecy of the message content is important. Thus, by using an encrypted message, it is possible to guarantee the secrecy of the message, to certify that the message comes from an authorized user, and to guarantee the integrity of the message.

The message is signed when the secrecy of the message is not important. In this case, the message includes a signature. Thus, by using a signed message, it is possible to certify that the message comes from an authorized user, and to guarantee the integrity of the message.

The message can also be encrypted first and signed afterwards.

However, such cryptographic systems can be subject to replay attacks, in which an external user (a hacker) records the message sent to reuse it.

In particular, in case the message is an encrypted message, the hacker is not able to read or understand the message content as it is encrypted. Nevertheless, the hacker can still reuse the encrypted message to deceive the receiver so as to induce the receiver to perform an unwanted action.

Moreover, in case the message is a signed message, the hacker is able to see the content and thus can know precisely the action which can be performed by the receiver. Thus, the hacker can reuse the signed message so as to induce the receiver to perform an unwanted action which is known by the hacker. By recording the signed messages in different communications, the hacker can build a collection of signed messages and use them as he wishes.

In order to prevent the external user from reusing the message, the message typically also contains an anti-repetition field (or "anti-replay field" or "freshness field"), uniquely associated with a specific transaction or communication between two devices. Thus, an external user cannot reuse a recorded message because the anti-replay field should be different than the one recorded previously.

The anti-replay field is also used in the encryption operation of the message or in the signature calculation for the message.

The value of the anti-replay field is not secret. However, the encryption and the signature calculation are performed using this unique anti-replay and a key.

In particular, in case of symmetric cryptography, the key used for encryption and the signature calculation is a secret key known by the transmitter and the receiver. Thus, even if the anti-replay field is not secret, an external user cannot decrypt the message or calculate a signature without knowing this secret key.

Besides, in case of asymmetric cryptography, the key used for the encryption operation is the public key of the receiver, the private key of the receiver is used for the decryption (only the receiver is able to decrypt). Thus, even if the anti-replay field is not secret, an external user cannot decrypt a message without knowing the private key of the receiver.

Concerning the signature calculation in asymmetric cryptography, the signature is calculated by the transmitter using his private key. The signature can be verified by the receiver using the transmitter public key. However, a recorded message cannot be reused as the external user cannot generate a signature without knowing the transmitter private key, and as the value of the anti-replay field should be different than the one of the recorded message.

The anti-replay field can be formed by a time stamp, by a causal or pseudo-random number ("nonce") or by a value generated by a monotonic counter.

The monotonic counter is configured to increment its value for each transaction. Thus, the use of a monotonic counter provides that the value associated with a transaction is greater than that associated with a previous transaction, and is typically used in single-chip integrated cryptographic systems, as it does not require complex time synchronization.

The value of the monotonic counter cannot be modified from outside. Thus, the use of a monotonic counter provides a secured anti-replay mechanism.

Moreover, the monotonic counter must have a large number of bits to guarantee a number of increments that can be performed during the life of the system on chip.

Cryptographic architectures are known in which the monotonic counter is implemented using pages of a non-volatile memory, for example a flash memory.

However, the use of non-volatile memories involves a high number of erasing and writing cycles of the memories themselves, in order to increase the value of the monotonic counter. The high number of cycles causes non-volatile memory to age and therefore a high risk of data loss. The prior monotonic counter implementations are based on flash memories (or any other non-volatile memory) where are allocated tens of pages for such service.

To support the above, it is necessary to erase/program areas of the flash memory hundreds of millions of times. This induces data lost due to flash page aging.

Moreover, the cryptography architecture is subject to a high risk of data loss even in the event of a loss of power supply during an erase or write operation.

Furthermore, the incrementation of the volatile counter register involves modifications in flash memory. Such modifications are slow to implement.

SUMMARY

Embodiments provide a system on chip architecture for cryptography applications capable of overcoming the aforementioned disadvantages.

According to an embodiment, a system on chip comprises a persistent power supply and a monotonic counter including a volatile counter register fed by the persistent power supply.

In particular the system on chip may comprise anti-replay mechanism comprising said monotonic counter including said volatile counter register fed by the persistent power supply.

A persistent power supply is a power supply, such as a battery back-up, configured to maintain system configuration data during power down or reboot of the system on chip.

The persistent power supply has a small probability to be switched off.

The monotonic counter is configured to increase the value of the volatile counter register each time the value of the volatile counter register is read.

Thus, the fact that the volatile counter register is fed by the persistent power supply guarantees that the value of the volatile counter register can be preserved also in case of the system on chip inactivity (stop, standby, etc.).

Indeed, the risk to have a power loss is low.

Moreover, the use of a volatile register makes it possible to accelerate the increments of the value of the volatile counter register stored in this volatile register, compared to a non-volatile register.

Such monotonic counter can be used to provide an anti-replay mechanism. In particular, the value of the volatile counter register can be used in an anti-replay field of a secure transaction.

According to a particularly advantageous embodiment, the monotonic counter comprises a bus interface configured to receive commands for the volatile counter register and a command interpreter including a command unit configured to interpret the commands received at the bus interface and to command the volatile counter register according to the commands received at the bus interface.

The bus interface is configured to be connected to a bus so as to communicate with other elements of the system on chip.

According to a particularly advantageous embodiment, the command interpreter also comprises a volatile power loss register fed by the persistent power supply. The command unit is also configured to store a defined bit word in the power loss register, read a bit word in the power loss register and compare this bit word to the defined bit word, and emit an interrupt when the command unit determines from said comparison that the bit word of the power loss register is different from the defined bit word, this interrupt being transmitted to the bus interface.

The defined bit word can be chosen during a design phase.

The defined bit word is stored in the power loss register when the persistent power supply delivers power. However, in case of power loss of the persistent power supply, the bit word in the power loss register is modified.

The power-loss register is to guarantee the integrity of the data stored inside the persistent counter.

Indeed, in case of power loss of the persistent power supply, the value of the volatile counter register is lost.

Thus, by reading the bit word of the power-loss register, it can be determined whether the value of the volatile counter register is correct.

According to a particularly advantageous embodiment, the defined bit word comprises a half of the bits being set to '0' and the other half being set to '1'. Such defined bit word is robust, for example against attacks consisting in changing the power supply of the system on chip out of a legal range or in adding noise or glitches on the power supply.

According to a particularly advantageous embodiment, the command unit is configured to read the bit word stored in the power loss register and compare this bit word to the defined bit word before the execution of a counter command.

In case of power loss of the persistent power supply, the monotonic counter is configured to proceed with a reset mechanism to ensure the monotonicity of the volatile counter register, i.e. to ensure to have a value of the volatile counter register superior to the value of the volatile counter register before the power loss of the persistent power supply.

According to a particularly advantageous embodiment, the command unit is configured to reset the volatile counter register after the emission of the interrupt, when the bit word of the power loss register is different from the defined bit word.

The reset procedure is used to set the value of the volatile counter register.

Before the completion of the reset procedure the monotonic counter is unusable.

The command unit can be configured to implement different reset procedure.

In particular, according to a particularly advantageous embodiment, the command unit is configured to register a bit, named milestone bit, in a non-volatile memory every n increments of the value of the volatile counter register. In case of a reset of the volatile counter register, the command unit is configured to read each milestone bit and to set the value of the volatile counter register to $MTC=(n+1)*m$, where m is the number of milestone bit read.

Such reset procedure is simple to implement and guarantees automatically the monotonicity of the volatile counter register.

According to a particularly advantageous embodiment, the command unit is configured to restore in the power loss register the defined bit word from a non-volatile memory after the reset of the volatile counter register.

Advantageously, the command interpreter includes configuration registers configured to store configuration data for the monotonic counter.

According to another embodiment a method for operating a monotonic counter of a system on chip for an anti-replay mechanism is disclosed, wherein the monotonic counter includes a volatile counter register, and wherein the method comprises feeding the volatile counter register by a persistent power supply.

Preferably, the method comprises receiving commands for the volatile counter register via a bus interface of the monotonic counter, interpreting the commands received at the bus interface using a command unit of a command interpreter of the monotonic counter, and commanding the volatile counter register according to the commands received at the bus interface using the command unit.

According to a particularly advantageous embodiment, the method comprises feeding a volatile power loss register of the monotonic counter by the persistent power supply, storing a defined bit word in the power loss register, reading a bit word in the power loss register and comparing this bit word to the defined bit word, and emitting an interrupt when the comparison indicates that the bit word of the power loss register is different from the defined bit word, this interrupt being transmitted to the bus interface.

Preferably, the defined bit word comprises a half of the bits being set to '0' and the other half being set to '1'.

According to a particularly advantageous implementation, the reading of the bit word stored in the power loss register and the comparation of this value of the power loss register to the defined bit word is executed before the execution of a counter command.

Advantageously, the method comprises a reset procedure to reset the volatile counter register after the emission of the interrupt, when the bit word of the power loss register is different from the defined bit word.

According to a particularly advantageous implementation, the method comprises registering a bit, named milestone bit, in a non-volatile memory every n increments of the value of the volatile counter register, the reset procedure comprising reading each milestone bit and setting the value of the volatile counter register to $MTC=(n+1)*m$, where m is the number of milestone bit read.

According to a particularly advantageous implementation, the method comprises restoring in the power loss register the defined bit word from a non-volatile memory after the reset of the volatile counter register.

BRIEF DESCRIPTION OF THE DRAWINGS

Other advantages and features of the invention will appear in the detailed description of embodiments and implementations, in no way restrictive, and the attached drawings in which:

FIG. 1 schematically illustrates an implementation of a first embodiment;

FIG. 2 schematically illustrates an implementation of a second embodiment; and

FIG. 3 schematically illustrates an implementation of a third embodiment.

DETAILED DESCRIPTION OF ILLUSTRATIVE EMBODIMENTS

FIG. 1 shows a system on chip SOC including a monotonic counter MTC and multiple other elements ELT1, . . . , ELT5.

Each element ELT1, . . . , ELT5 of the system on chip SOC has its own function. For example, the system on chip SOC can comprises memories, cryptographic devices . . . .

The system on chip also comprises a persistent power supply VP. A persistent power supply VP is a power supply such as a battery back-up used to maintain the system configuration data during power down or reboot of the system on chip.

The persistent power supply VP has a small probability to be switched off.

The different elements ELT1, . . . , ELT5 of the system on chip SOC and the monotonic counter MTC are connected through a bus BU.

The bus BU can be an Advanced Microcontroller bus Architecture (AMBA). For example, the bus can be an AHB ("AMBA High-Performance Bus") or an AXI (Advanced eXtensible Interface).

More particularly, the monotonic counter MTC can be connected to the bus BU via a security stub SS.

The security stub SS can be used to restrict the usage of the monotonic counter to some particular security peripheral subdomains.

The monotonic counter MTC includes a bus interface BI.

The bus interface BI is configured to receive commands from outside the monotonic counter MTC via signals BU_SIG. The commands can be a user command for incrementing, reading or storing value in a volatile counter register CNT of the monotonic counter MTC. The commands can also be configuration commands.

The volatile counter register CNT is fed by the persistent power supply.

This guarantees that the value of the volatile counter register can be preserved also in case of the system on chip inactivity (stop, standby, etc.).

Indeed, the risk to have a power loss is low.

Moreover, the use of a volatile register makes it possible to accelerate the increments of the value of the volatile counter register stored in this volatile register, compared to a non-volatile register.

In particular, the value of the volatile counter register can be used in an anti-replay field of a secure transaction.

The bus interface BI also receives a clock signal CLK to synchronize the bus interface BI, and a reset signal RST to reset the bus interface.

The monotonic counter MTC also receives a power-on reset signal PRST.

In particular, the monotonic counter MTC comprises a command interpreter CI. The command interpreter CI is configured to recognize the commands CMD_DAT received at the bus interface BI. The command interpreter CI comprises a command unit CSM to recognize the commands, and registers CDR, CFR, PLR to store commands and data for example.

In particular, the command interpreter CI comprises command and data registers CDR.

These command and data registers CDR are configured to store commands of the volatile counter register CNT before their execution.

Command and data registers CDR are also configured to receive values MTC_VAL of the volatile counter register CNT and to deliver new reset values MTC_VAL_RST to the volatile counter register CNT.

Command and data registers CDR also receive the clock signal CLK to synchronize them, and a reset signal RST to reset them.

The command interpreter CI also comprises configuration registers CFR. The configuration registers CFR are fed by the persistent power supply VP. The configuration registers CFR are configured to store configuration data.

In particular, the configuration registers CFR are used to store data regarding command execution mode. For example, in case a security stub SS is used between the monotonic counter MTC and the bus BU, the command can be executed directly. Besides, in case no security stub SS is used between the monotonic counter MTC and the bus BU, the command can be executed with an authentication procedure disclose below. Thus, the configuration registers CFR are used to store data indicating whether the command has to be executed directly or after an authentication procedure. The configuration registers CFR can also be used to store the response command criteria (direct or authenticated).

The configuration registers CFR also receive the clock signal CLK to synchronize them, and the reset signal RST to reset them.

As shown on FIG. 2, the command interpreter CI includes a command unit CSM.

The command unit CSM is configured to recognize the commands received at the bus interface BI. When the command unit CSM recognizes the commands, the command unit CSM is also configured to store these commands in command and data registers CDR. The command unit CSM is also configured to command the volatile counter register CNT according to the commands received at the bus interface BI.

More particularly, the command unit CSM is a state machine circuitry.

More particularly, the command unit CSM has an output configured to deliver a signal INCR to the volatile counter register CNT to increment its value.

The command unit CSM also has an output configured to deliver a signal RD to the volatile counter register CNT to instruct a reading of its value. When the command unit CSM instructs a reading, the volatile counter register CNT delivers the actual value MTC_VAL of the volatile counter register CNT to the command and data registers CDR. This value MTC_VAL is then transmitted to the bus interface BI.

The command unit CSM also has an output configured to deliver a signal STR to the volatile counter register CNT to instruct a storing of a value in the volatile counter register CNT. When the command unit CSM instructs a storing, the volatile counter register CNT stores the value MTC_VAL_RST from the command and data registers CDR.

The command unit CSM is also configured to receive the clock signal CLK to synchronize it, and the reset signal RST to reset it.

The command unit CSM is also configured to exchange data CFG_DAT with the configuration registers CFR.

The command unit CSM is also configured to transmit commands LCMD and data LDAT to the command and data registers.

The command unit CSM is fed by the power supply VLOG which is not a persistent power supply.

The command unit CSM is configured to determine whether a command is a valid command from a first byte of a command received at the bus interface BI.

In case the command unit CSM determines that the command received at the bus interface BI is a valid command, the command unit is configured to enable the storage of the command LCMD and the related data LDAT in command and data registers CDR, or in configuration registers CFR.

In case the command unit CSM determines that the command received at the bus interface BI is not a valid command, the command unit CSM is configured to discard this command.

Before the execution of a command, the command unit CSM checks whether the integrity of the value of the volatile counter register CNT.

Indeed, as indicated before, the persistent power supply VP has a small probability to be switched off.

However, in case the persistent power supply VP is switched off, the value of the volatile counter register CNT is lost.

Thus, to ensure, the integrity of the value of the volatile counter register CNT, the command interpreter CI also comprises a power-loss register PLR.

The power loss register PLR is an M bit register, such as 8 or 16 bit, fed by the persistent power module VP. The power loss register PLR can also be reset via a signal VP_RST.

The command unit is configured to store a defined bit word in the power loss register PLR.

To control the integrity of the value of the volatile counter register CNT, before the execution of a command, the command unit CSM is configured to read a bit word stored in the power loss register PLR and compare this bit word to the defined bit word. The bit word stored in the power loss register PLR is transmitted to the command unit CSM via signal PLR_DAT.

If the bit word in the power loss register PLR is the same than the defined bit word, this indicates that the system on chip SOC has not been subject to a power loss.

However, if the bit word in the power loss register PLR is different from the defined bit word, this indicates that the system on chip SOC has been subject to a power loss.

The defined bit word is stored in the power loss register PLR when the persistent power supply VP delivers power. However, in case of power loss of the persistent power supply VP, the bit word in the power loss register is modified.

The defined bit word can be chosen during a design phase. For example, the defined bit word can be equal to 0xAA (hexadecimal notation).

Preferably, the defined bit word comprises a half of the bits being set to 'o' and the other half being set to '1' (for example 0xAA, 0x55, 0x0F, etc.). Such defined bit word is robust, for example against attacks consisting in changing the power supply of the system on chip out of a legal range or in adding noise or glitches on the power supply. Indeed, such attacks could be used to modify the value of the power loss register to 0x00 or 0xFF. Thus, as the defined bit word comprises a half of the bits being set to '0' and the other half being set to '1', the defined bit word is sufficiently different from values which can result from those attacks.

The power-loss register PLR is to guarantee the integrity of the data stored inside the persistent counter.

In particular, as the command unit CSM is configured to read the bit word stored in the power loss register PLR and compare this bit word to the defined bit word, before the execution of a command, the command unit CSM is able to know whether the system on chip SOC has been subject to a power loss. The reading of the power loss register PLR and the comparison can also be performed periodically.

In particular, in case of a power loss, the bit word stored in the power loss register can be altered. Thus, the bit word stored in power loss register can be different from the expected pattern of the defined bit word (0xAA or 0x55 for example). For example, after a power loss the bit word stored in the power loss register can be equal to 0x00.

Moreover, the command unit CSM is also configured to emit an interrupt INT1 when the command unit detects from the comparison that the bit word of the power loss register PLR is different from the expected defined bit word. This interrupt INT1 is transmitted to the bus interface BI.

This interruption INT1 serves to indicate to other elements of the system on chip that the value of the volatile counter register CNT may not be correct due to a power loss.

When the command unit CSM detects that the system on chip SOC has been subject to a power loss, the command unit CSM is configured to start a reset procedure. The reset procedure is used to set the value of the volatile counter register CNT so as to retrieve the integrity of the volatile counter register CNT. The reset procedure to implement can be configurable by using the configuration register.

In particular, the command unit CSM can be configured to implement different reset procedure.

For example, a first reset procedure consists in providing a new value for the volatile counter register and configurations values by using an authenticated command. An authenticated command is a command with a signature. The signature is calculated by using a MAC algorithm with a freshness. A random number generator is used to provide a random number to calculate the signature.

A second reset procedure consists in providing a new value for the volatile counter register and configurations values by using an encrypted command packet. For example, the command packet is encrypted using an AES algorithm ("Advanced Encryption Standard"). The command packet includes a random number generated by a random number generator to avoid replay attack.

Preferably, a third reset procedure is implemented.

The third reset procedure consists in defining the value of the volatile counter register CNT from a number of bits, named milestone bits, from a non-volatile memory. The non-volatile memory can be an internal flash memory of the system on chip.

In particular, during the normal operation of the volatile counter register CNT, the command unit CSM is configured to register a milestone bit in the non-volatile memory every n increments of the value of the volatile counter register CNT. The number n of increments needed to store a milestone bit is defined according to a desired granularity. The higher the value of n, the lower the granularity is and the higher the amount of non-volatile memory needed to store the milestone bits is.

During the reset procedure, the command unit CSM is configured to read each milestone bit. Then, the command unit is configured to set the value of the volatile counter register to MTC=(n+1)*m, where m is the number of milestone bit read, and n represents the granularity (the number of increments needed to store a milestone bit).

Before the completion of the reset procedure the monotonic counter is unusable.

In the event of persistent power loss, the defined bit word is restored in the power loss register PLR via signal REST at the end of the reset procedure.

Besides, when the command unit CSM detect that the system on chip SOC has not been subject to a power loss, the command unit CSM can be configured to proceed with other security checks before the execution of the command, according to the command execution mode stored in configuration registers CFR.

In particular, in case a security stub SS is used between the monotonic counter MTC and the bus BU, the command can be executed directly, with no other security checks. Indeed, the security stub is configured to implement these security checks.

However, in case no security stub SS is used between the monotonic counter MTC and the bus BU, the command unit CSM can be configured to proceed with the authentication procedure before the execution of the command.

In particular, in the authenticated command execution mode, cryptographic methods are used to ensure the authentication. Thus, the command packet comprises a MAC signature (MAC being the acronym of "Message Authentication Code") and a freshness field. The value of the freshness field is a random value provided with a random number generator of the system on chip or generated by a pseudo random generator implemented by a devoted core of the system on chip.

In particular, the command unit CSM can be configured to proceed with a freshness check. During the freshness check, the command unit checks whether the value of the freshness field, i.e. the value of the volatile counter register CNT, is the one expected. In particular, the command unit CSM compares the value of the volatile counter register to the value of the freshness field.

If the value of the freshness field is different from the value of the volatile counter register CNT, the command is discarded.

Otherwise, the command unit CSM is configured to start a signature check procedure. At the beginning of the signature check procedure, the command unit CSM is configured to generate a specific signature check interrupt INT2 toward one of the cores of the system on chip SOC and to wait for a result of a signature check performed by the core, to know if the signature is correct or not. In particular, the core of the system on chip SOC is configured to execute the signature check and to send the result to the monotonic counter, the result indicating whether the signature is identical to the one expected. The core can comprise hardware resources to perform the signature check. As a variant, the core can also be configured to execute a software module adapted to perform the signature check. The core can also use both of hardware resources and a software module to perform the signature check.

Then, when the interrupt is served by the core, the command unit CSM is configured to provide on core request the command packet stored.

Then, the core calculates the MAC signature, by using another element of the system on chip SOC or by software and provides the calculated signature to the command unit CSM. The calculated signature can be written inside the command and data registers CDR.

Then, the command unit CSM compares the calculated signature to the one received with the command.

If the calculated signature is different from the signature received with the command, the command is discarded.

Otherwise, the command unit CSM executes the command. The command result is then communicated to a host according to the mode selected in the configuration registers. In particular, the command response mode can be a direct response or an authenticated response.

In case the select mode is the direct response mode, the command unit CSM is configured to send directly a command response packet to a host (internal or external to the system on chip) by following bus protocol rules.

In case the select mode is the authenticated response mode, the command response packet is signed by using a MAC algorithm, for example HMAC-SHA256. The command response packet thus comprises the command response, a freshness field and a response signature. This command response packet is sent to a host (internal or external to the system on chip) by following bus protocol rules.

A method of operating the monotonic counter is shown on FIG. 3.

At initial step 30, the monotonic counter starts a design phase. During this design phase, the command unit stores the defined bit word in the power loss register. The power loss register is fed by the persistent power supply.

At step 31, the monotonic counter receives a command at its bus interface BI.

At step 32, the command unit CSM receives the first byte of the command from the bus interface, and determines whether the command is a valid command.

If the command unit CSM determines that the command is a valid command, the command unit stores, at step 34, the command and the related data in command and data registers CDR, or in configuration registers CFR.

If the command unit CSM determines that the command is not a valid command, the command unit CSM discards the command at step 33.

After step 34, the command unit CSM verifies the integrity of the value of the volatile counter register CNT at step 35.

In particular, the command unit reads the bit word stored in the power-loss register and compares this bit word to the defined bit word.

If the command unit CSM determines that the bit word stored in the power loss register PLR is the same than the defined bit word, the command unit concludes that the system on chip SOC has not been subject to a power loss, and that the value of the volatile counter register is correct. Thus, the command unit can proceed with further security checks if necessary, at step 39, before the execution of the command.

However, if the command unit determines that the bit word stored in the power loss register PLR is different from the defined bit word, the command unit concludes that the system on chip SOC has been subject to a power loss, and that the value of the volatile counter register is incorrect. In this case, the command unit emits at step 36 an interrupt INT1 which is transmitted to the bus interface BI.

After the emission of the interrupt INT1, the command unit performs a reset procedure at step 37 to retrieve the integrity of the volatile counter register CNT. In particular, the command unit reads the configuration registers to determine which kind of reset procedure has been selected.

For example, in case the reset procedure selected is the third one previously described, the command unit CSM reads each milestone bit stored in the non-volatile memory. Then, the command unit is configured to set the value of the volatile counter register to MTC=(n+1)*m, where m is the number of milestone bit read and n represents the granularity (the number of increments needed to store a milestone bit).

Then, the command unit restores the defined bit word in the power loss register PLR at step 38

Besides, as mentioned above, when the command unit CSM detects that the system on chip SOC has not been subject to a power loss, the command unit CSM can proceed with further security checks if necessary, at step 39, before the execution of the command.

In particular, the command unit reads the configuration registers CFR to know the command execution mode.

If the command execution mode is the direct execution mode, the command unit can execute directly the command at step 41.

If the command execution mode is the authenticated command execution mode, the command unit proceeds with further security checks (freshness check and signature check as described above) at step 39.

If the command passes the security checks, the command can be executed at step 41. Otherwise, the command is discarded at step 40.

The command execution at step 41 leads to a command result issued from the volatile counter register. This command result is transmitted to the command unit at step 42. The command unit transmits this command result to a host via the bus interface, according to a response mode selected in the configuration registers (authenticated response or direct response as described above).

Embodiments provide an architecture of a monotonic counter that can be integrated into a system on chip system for cryptography applications, which is not subject to data loss or aging, thanks to the use of a volatile register. Furthermore, the use of a volatile register allows to increase the rate of increase of the monotonic counter value.

Of course, the embodiments are susceptible to various variations and modifications which will be apparent to those skilled in the art. For example, the monotonic counter can include more than one counter fed by the persistent power supply. In this case, the monotonic counter can still include only one command interpreter CI. In particular, the command unit of the command interpreter can be configured to command each counter by selecting the counter for which the command is addressed. More particularly, the command unit can comprise outputs dedicated to enable or disable the counters. Thus, to command a counter, the command unit can enable this counter and disable the other counters.

What is claimed is:

1. A system on chip comprising:
 a persistent power supply; and
 anti-replay mechanism comprising a monotonic counter including a volatile counter register powered by the persistent power supply, wherein the monotonic counter comprises a volatile power loss register powered by the persistent power supply, and wherein the monotonic counter is configured to:
  store a defined bit word in the volatile power loss register,
  read a bit word in the volatile power loss register and compare the bit word to the defined bit word, and
  emit an interrupt in response to the comparison determining that the bit word of the volatile power loss register is different from the defined bit word, the interrupt being transmitted to a bus interface.

2. The system on chip according to claim 1, wherein the monotonic counter comprises:
 the bus interface, the bus interface being configured to receive commands for the volatile counter register; and
 a command interpreter including a command unit configured to:
  interpret the commands received at the bus interface, and
  command the volatile counter register according to the commands received at the bus interface.

3. The system on chip according to claim 2,
 wherein the command interpreter further comprises the volatile power loss register, and
 wherein the command unit is further configured to:
  store the defined bit word in the volatile power loss register,
  read the bit word in the volatile power loss register and compare the bit word to the defined bit word, and
  emit the interrupt.

4. The system on chip according to claim 3, wherein the defined bit word is a bit word with half the bits being set to 'o' and the other half of the bits being set to '1'.

5. The system on chip according to claim 3, wherein the command unit is configured to read the bit word stored in the volatile power loss register and compare a value of the bit word stored in the volatile power loss register to the defined bit word before an execution of a command.

6. The system on chip according to claim 3, wherein the command unit is configured to reset the volatile counter register after emission of the interrupt, when the bit word of the volatile power loss register is different from the defined bit word.

7. The system on chip according to claim 6, wherein the command unit is configured to register a bit, named milestone bit, in a non-volatile memory every n increments of a value of the volatile counter register, and wherein, in case of a reset of the volatile counter register, the command unit is configured to read each milestone bit and to set the value of the volatile counter register to MTC=(n+1)*m, where m is the number of the milestone bit read.

8. The system on chip according to claim 6, wherein the command unit is configured to restore in the volatile power loss register the defined bit word from a non-volatile memory after resetting the volatile counter register.

9. The system on chip according to claim 2, wherein the command interpreter includes configuration registers configured to store configuration data for the monotonic counter.

10. A method of operating a monotonic counter of a system on chip for an anti-replay mechanism, wherein the monotonic counter includes a volatile counter register and a volatile power loss register, the method comprising:
  powering the volatile counter register and the volatile power loss register by a persistent power supply;
  storing a defined bit word in the volatile power loss register;
  reading a bit word in the volatile power loss register;
  comparing the bit word to the defined bit word; and
  emitting an interrupt in response to the comparison determining that the bit word of the volatile power loss register is different from the defined bit word, the interrupt being transmitted to a bus interface.

11. The method according to claim 10, further comprising:
  receiving, by the monotonic counter, commands for the volatile counter register via the bus interface;
  interpreting, by a command unit of a command interpreter of the monotonic counter, the commands received at the bus interface; and
  commanding, by the command unit, the volatile counter register according to the commands received at the bus interface.

12. The method according to claim 10, wherein the defined bit word is a bid word with half of the bits being set to '0' and the other half of the bits being set to '1'.

13. The method according to claim 10, wherein reading the bit word stored in the volatile power loss register and comparing a value of the bit word of the volatile power loss register to the defined bit word is executed before an execution of a command.

14. The method according to claim 10, further comprising performing a reset procedure to reset the volatile counter register after emission of the interrupt, when the bit word of the volatile power loss register is different from the defined bit word.

15. The method according to claim 14, further comprising registering a bit, named milestone bit, in a non-volatile memory every n increments of a value of the volatile counter register, the reset procedure comprising reading each milestone bit and setting the value of the volatile counter register to $MTC=(n+1)*m$, where m is the number of the milestone bit read.

16. The method according to claim 14, further comprising restoring in the volatile power loss register the defined bit word from a non-volatile memory after the reset of the volatile counter register.

17. A method of operating a monotonic counter of a system on chip, wherein the monotonic counter includes a volatile counter register, a volatile power loss register and a bus interface, the method comprising:
  powering the volatile power loss register by a persistent power supply;
  receiving a command at the bus interface;
  verifying an integrity of a value of the volatile counter register by:
    reading a bit word in the volatile power loss register and comparing the bit word to a defined bit word; and
    determining whether the monotonic counter was subject to a power loss;
  emitting an interrupt to the bus interface when concluding that the monotonic counter was subject to the power loss when the comparison indicates that the bit word of the volatile power loss register is different from the defined bit word; and
  performing a reset procedure to reset the volatile counter register after emission of the interrupt.

18. The method according to claim 17, further comprising registering a bit, named milestone bit, in a non-volatile memory every n increments of the value of the volatile counter register, the reset procedure comprising reading each milestone bit and setting the value of the volatile counter register to $MTC=(n+1)*m$, where m is the number of the milestone bit read.

19. The method according to claim 17, further comprising restoring in the volatile power loss register the defined bit word from a non-volatile memory after the reset of the volatile counter register.

* * * * *